United States Patent [19]
Hua et al.

[11] Patent Number: 5,297,070
[45] Date of Patent: Mar. 22, 1994

[54] TRANSFORM PROCESSING CIRCUIT

[75] Inventors: Kien T. Hua, Prospect; John D. O'Sullivan, Ermington; Colin E. Jacka, North Turramurra; David R. Brown, Roseville, all of Australia

[73] Assignee: Commonwealth Scientific and Industrial Research Organisation, Australia

[21] Appl. No.: 466,276

[22] Filed: Apr. 6, 1990

[30] Foreign Application Priority Data

Aug. 21, 1987 [AU] Australia ............................ 3888/87

[51] Int. Cl.⁵ .......................... G06F 7/38; G06F 15/34
[52] U.S. Cl. ...................................... 364/726; 364/736
[58] Field of Search .......................................... 364/726

[56] References Cited

U.S. PATENT DOCUMENTS

| | | | |
|---|---|---|---|
| 3,673,399 | 6/1972 | Hancke et al. | 364/726 |
| 3,702,393 | 11/1972 | Fuss | 364/726 |
| 3,892,956 | 7/1975 | Fuss | 364/726 |
| 4,092,723 | 5/1978 | Picaquendar et al. | 364/726 |
| 4,181,976 | 1/1980 | Collins et al. | 364/726 |
| 4,899,301 | 2/1990 | Nishitani et al. | 364/726 |

*Primary Examiner*—Dale M. Shaw
*Assistant Examiner*—Sang H. Kim
*Attorney, Agent, or Firm*—Blakely, Sokoloff, Taylor & Zafman

[57] ABSTRACT

The elements of a transform processing circuit are switchable to change the order of data in a data stream and/or to perform a fast Fourier transform (FFT) or inverse fast Fourier transform (IFFT) on the data stream. Each arithmetic circuit element performs an M-point butterfly operation on complex sample points and includes an adder/subtractor and a serial memory capable of storing M/2 sample points. Each multiplication unit performs an n-point complex twiddle factor operation on its input. The conjugator units conjugate inputted sample points. All circuit elements are connected to buses by switches. These connections are switchable so that in one switch state data input at left terminal flows to right terminal and in another state data input at right terminal flows to left terminal. The state of the bus switches also determines whether the circuit performs a FFT, an IFFT, or a bit reversal operation on input data. Transfer processing circuit may be incorporated into an integrated circuit together with a complex multiplier and a multiplexer, the integrated circuit is capable of performing FFT and IFFT operations on vectors or on transformed vectors and is capable of performing vector multiplication.

29 Claims, 12 Drawing Sheets

TRANSFORM PROCESSING CIRCUIT

BACKGROUND OF THE INVENTION

FIELD OF THE INVENTION

The present invention relates to a transform processing circuit which is particularly, but not exclusively, advantageous for performing Fourier Transforms.

The Fourier Transform is an algorithm which has many applications in signal processing techniques and is used to transform variables, functions and data from a first domain to a second domain and the inverse of the algorithm performs the reverse transformation. The discrete version of the Fourier Transform is given by the following equation where $x(k)$, $k=0,1,2 \ldots N-1$, represents complex sample points in a first domain, N is the number of sample points, and $X(n)$, $n=0 \ldots N-1$, represents the transformed points in a second domain.

$$X(n) = \Sigma x(k) e^{-j2\pi nk/N} \quad (1)$$

The inverse transform is as follows.

$$x(n) = \Sigma_n x(n) e^{j2\pi nk/N} \quad (2)$$

For the purposes of simplifying the remaining description the first domain is chosen to be the time domain and the second domain is chosen to be the frequency domain.

The FFT was introduced in 1965 and reduces the number of arithmetic operations which need to be performed in order to carry out an N point transform. The FFT now forms the basis of efficient algorithms for filtering, convolution, correlation, smoothing and other signal processing techniques. The transform is also used in the operation of signal processors such as those employed in spectrum analysers and sonar array beam formers.

A number of FFT processors have been proposed which receive N sample points and produce N transformed points, corresponding to the samples, in a "bit reversed order". Bit, reversed order means the transformed points are not produced in the same order as the sample points are received, e.g. for N=4, x(0), x(1), x(2), x(3) are received and X(0), X(2), X(1) and X(3) are produced, respectively.

Once a number of points have been transformed it is often desirable to multiply the transformed points by a predetermined frequency response and then inverse transform the result into a number of output points in the time domain, using the inverse FFT. This enables the effect of the response on real time signals to be determined and allows a precise frequency response to be applied to a real time signal. To do this, however, a separate processing unit is normally required to perform the inverse FFT (IFFT) and the bit reversed order of the transformed points must be corrected before the points are applied to the frequency response. The points produced after application of the response are transformed by the IFFT processing unit, and the transformed points generated thereby are in the time domain and represent the real time effect of the response. The transformed points in the time domain, however, are produced in bit reversed order and again an adjusting process needs to be performed so as to produce a natural order representation of a real time signal. Alternatively in performing the above procedure the frequency response may be bit reversed, applied to the bit reversed output of the FFT processor and the result reordered before being applied to an IFFT processing unit, yet the end result will still appear in bit reversed order.

The bit reversal problem also occurs in performing transforms other than the FFT and it is desirable to provide a general transform processing circuit which is able to overcome this problem.

A further problem associated with known FFT processors, apart from the bit reversal problems discussed above, is that the range of applications for FFT processors is limited by their speed of operation. To enhance the speed of operation it is desirable to perform as many operations as possible in parallel when performing an N point transform, for example, by using a pipelining technique. Known FFT processors are also usually configured by controlling the steps of a transform using software and, hence, it is also desirable, in order to obtain improvements in speed and size, to provide an FFT processor which may be configured in hardware to perform a predetermined FFT algorithm.

SUMMARY OF THE INVENTION

Another problem associated with known FFT processors is that as the number of sample points N to be processed increases the amount of memory space required also increases and therefore the amount of memory which can be placed on a processor without making the processor impractically large restricts the number of points that can be transformed. Hence, it is desirable to develop a processor which utilises a minimum amount of memory space. Reducing memory space utilised also reduces cost and improves power consumption.

In accordance with the present invention there is provided a transform processing circuit comprising:

first and second input/output terminals; and a plurality of processing units connected in series between said input/output terminals;

wherein data in a first order inputted at said first terminal and passed through said units sequentially is transformed and outputted at said second terminal in a second order, and data in said second order inputted at said second terminal and passed through said units sequentially is transformed and outputted at said first terminal in said first order.

Preferably said processing units include means for setting the direction in which data passes through said circuit.

Preferably said first order is natural order and said second order is bit reversed order.

Preferably said processing circuit further comprises a data bus which connects said units in series and is connected at one end to said first terminal and at the other end to said second terminal, wherein said means comprises bus switching means which can be set in a first state, such that data inputted in natural order at said first terminal is transformed by said units and outputted at said second terminal in bit reversed order, and a second state, such that data inputted at said second terminal in bit reversed order is transformed by said units and outputted at said first terminal in natural order.

Preferably said processing circuit is capable of performing an N point M on data inputted serially thereto, said data being representative of N sample points and N being equal to $2^n$ where n is a positive integer greater than 1, wherein said processing units include:

n arithmetic units for performing butterfly operations on said data; and (n−1) multiplication units for performing predetermined complex multiplications on said data, one of said multiplication units being connected between each adjacent pair of said arithmetic units;

said units each including said bus switching means which can be set in said first state, such that said data inputted in natural order at said first terminal is transformed by said units and outputted at said second terminal in bit reversed order, and said second state, such that said data inputted at said second terminal in bit reversed order is transformed by said units and outputted at said first terminal in natural order.

Preferably said processing circuit further comprises first and second conjugator units connected respectively to said first and second terminals and in series with said arithmetic and multiplication units, wherein said conjugator units, when enabled, conjugate said data such that said data on being outputted from said first or second terminal is inverse transformed by said circuit according to an N point inverse FFT (IFFT), and when disabled, said data is transformed according to said FFT.

In accordance with the present invention there is also provided an integrated circuit comprising:

a processing circuit as claimed in any one of the preceding claims;

at least one input port;

at least one output port;

an independent complex multiplier having two inputs and which multiplies two operands represented by data inputted on said inputs, respectively;

a further input port connected to one input of said independent complex multiplier; and a multiplexer which transmits data received from the first or second input/output terminal of said processing circuit, said at least one input port, or the output of said independent complex multiplier to said at least one output port, the other input of said independent complex multiplier or the first or second input/output terminal of said processing circuit.

DETAILED DESCRIPTION OF THE INVENTION

A preferred embodiment of the present invention will now be described, by way of example only, with reference to the accompanying drawings wherein.

The FFT algorithm employed in the preferred embodiment of the FFT processing circuit is hereinafter briefly described with reference to FIGS. 1 and 2.

The algorithm used is based on a recursive radix decomposition and is obtained by first splitting the N point transform recited in equation (1) by defining n and k as set out in the following equations.

$$n = n_1 r_1 + n_0 \quad :n_o = 0,1 \ldots (r_1 - 1) \tag{3}$$
$$:n_1 = 0,1 \ldots (r_2 - 1)$$

$$k = k_1 r_2 + k_0 \quad :k_o = 0,1 \ldots (r_2 - 1) \tag{4}$$
$$:k_1 = 0,1 \ldots (r_1 - 1)$$

By making a substitution as defined in equations (3) and (4) and after performing some manipulation, the transform can be written as a three step process, as defined in the following equations.

$$X_1(n_0,k_0) = \sum_{k_1} x(k_1,k_0) \cdot \exp(-j2\pi n_0 k_1/r_1) \tag{5}$$

$$X_1(n_0,k_0) = X_1(n_0,k_0) \cdot \exp(-j2\pi n_0 k_0/N) \tag{6}$$

$$X_2(n_0,n_1) = \sum_{k_0} X_1(n_0,k_0) \cdot \exp(-j2\pi n_1 k_0/r_2) \tag{7}$$

Thus, the original transform is divided into three stages, two stages of arithmetic operations and one stage comprising complex multiplication. Equations (5) to (7) represent an FFT algorithm which enables a 256 point transform to be divided into effectively two 16 point transforms. The algorithm can then be applied to further divide the 16 point transforms into 4 point transforms and so on.

Figure 1:
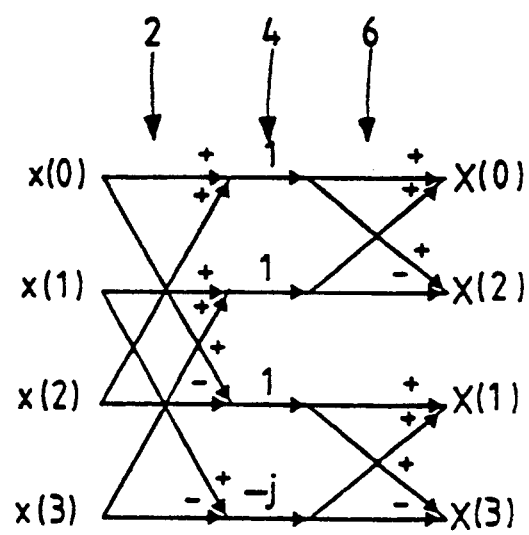
FIG. 1 is a diagrammatic representation of an FFT algorithm, which an FFT processing circuit according to the present invention employs, as applied to 4 sample points.

FIG. 1 shows how the algorithm is applied to 4 sample points, x(0) ... x(3). Initially, a first set of arithmetic operations 2 are performed, such as x(o)+x(2) and x(0)−x(2). Next each result of the arithmetic operations 2 is multiplied by an appropriate complex number. The values obtained following the multiplication operations 4 are subjected to final arithmetic operations 6, which give rise to the transformed points X(0) ... X(3) in bit reversed order, as shown in FIG. 1. The arithmetic operations 2 and 6 are known as butterfly operations and are performed by arithmetic units known as butterfly units. Complex numbers required for the multiplications 4 are known as complex twiddle factors and the multiplications as complex twiddle factor operations.

Figure 2:
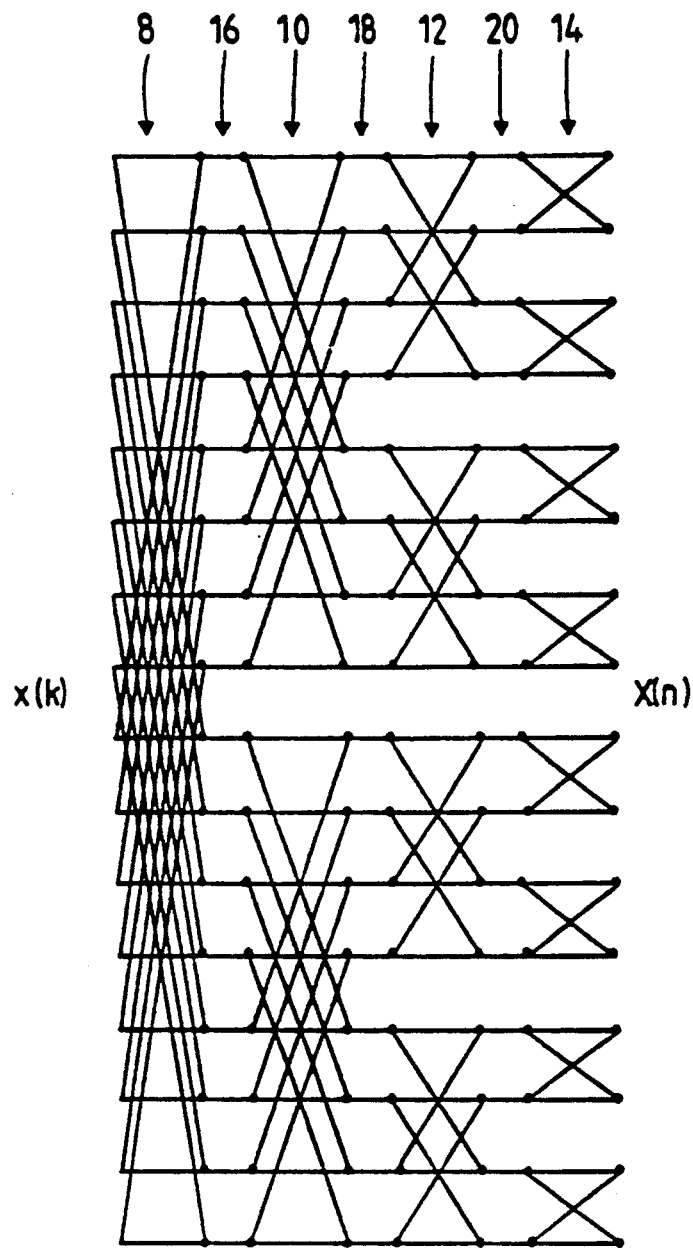
FIG. 2 is a diagrammatic representation of the algorithm of FIG. 1 as applied to 16 sample points.

A 16 point transform using the above algorithm, as illustrated in FIG. 2, comprises 4 butterfly operation stages 8, 10, 12 and 14, with 3 complex multiplication stages 16, 18 and 20 disposed therebetween. For each arithmetic operation performed in the butterfly operation stage 8, a least significant point, $x(0) \ldots x((N/2)-1)$, always combines with a most significant point, $x(N/2) \ldots z(N-1)$, to form the operands of the operation. Similarly, for each of the succeeding butterfly operations in the stages 10, 12 and 14, with respect to the points involved, the least significant points always combine with the most significant points to form the operands, as shown in FIG. 2. The first operation stage 8 involves one 16 point butterfly operation, the second stage 10 involves two 8 point butterfly operations, the third stage 12 involves four 4 point butterfly operations and the last stage 14 involves eight 2 point butterfly operations.

Figure 3:
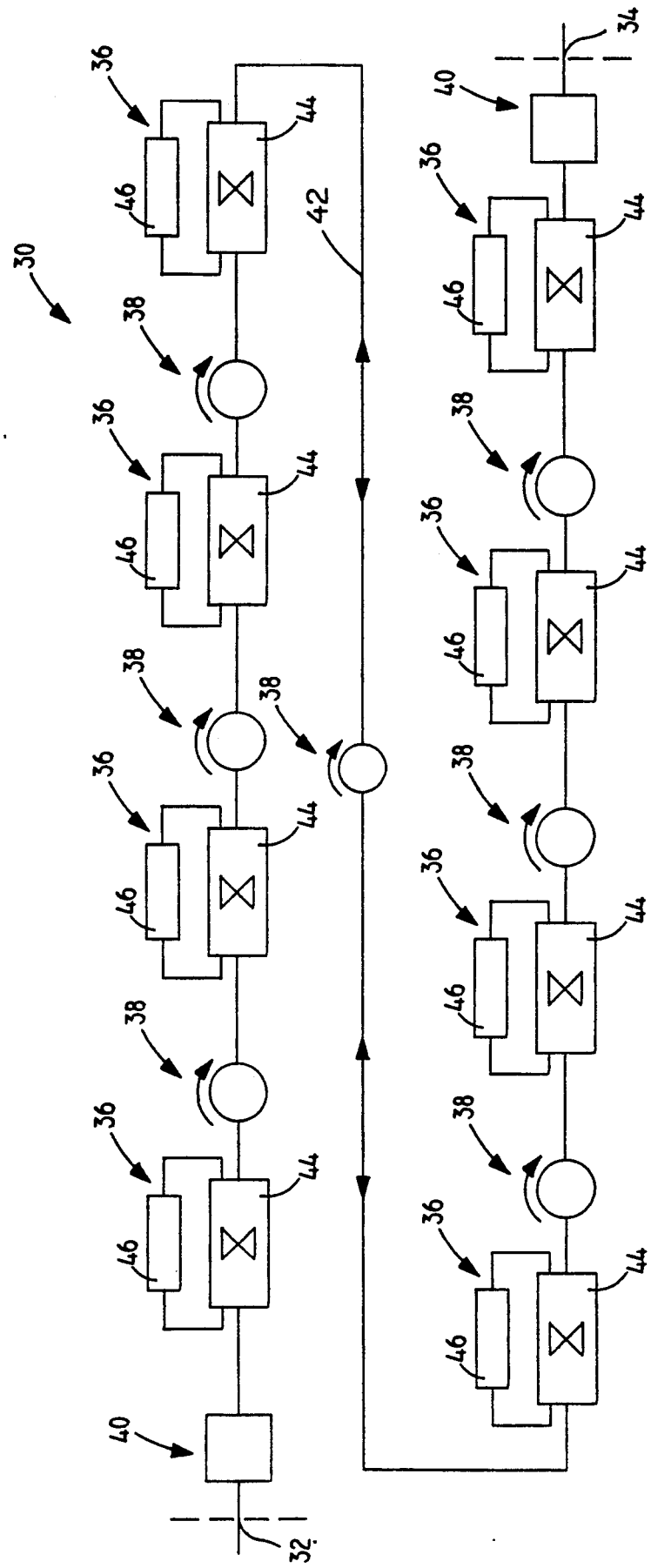
FIG. 3 is a block diagram of an FFT processing circuit according to the present invention.

A fast fourier transform processing circuit 30, as shown in FIG. 3, is capable of performing an FFT or IFFT on 256 sample points. The FFT circuit 30 comprises left input/output terminal 32, a right input/output terminal 34, eight arithmetic units 36, seven multiplication units 38 for performing complex twiddle factor operations and a pair of conjugator units 40. The units 36, 38, 40 and the terminals 32 and 34 are interconnected by a four bit bidirectional data bus 42. The units 36, 38 and 40 are connected in cascade between the terminals 32 and 34 and a multiplication unit 38 is connected between adjacent arithmetic units 36. The conjugator units 40 are connected between the terminals 32 and 34 and the arithmetic units 36 closest to the terminals 32 and 34.

The four bit data bus 42 includes two lines for transmitting data representative of complex sample points to be transformed. The first line carries words representing the real parts of the complex sample points and the second line carries words representing the imaginary parts of the complex sample points. The other two lines of the bus 42 carry data which is used by the circuit 30 to identify and synchronise complex sample point data on the bus 42. One of these lines is a word line which is high whenever the least significant bits of words representing a sample point are incident on the real and imaginary lines. The real and imaginary words representing a sample point are always respectively incident simultaneously on the real and imaginary lines. Signals on the word line are used to determine the beginning and end of words which appear on the real and imaginary lines. The fourth line is a vector start line which indicates the start of a series of sample points to be transformed. The vector start line is high whenever words representing the first complex sample point of N points to be transformed are present on the real and imaginary lines.

The arithmetic units 36 are each adapted to perform an M point butterfly operation on complex sample points inputted to the units 36. The units 36 include an adder/subtractor 44 and a serial memory 46 connected to the adder/subtractor 44 that is capable of storing M/2 sample points. In performing an M point butterfly operation, the first M/2 sample points inputted to an arithmetic unit 36 are stored in the delay memory 46. As the second M/2 points, or the most significant points, are inputted to the unit 36 and to the adder/subtractor 44, the stored M/2 least significant points are outputted to the adder/subtractor 44 and a butterfly operation is sequentially performed on the points, a least signficant point and most significant point forming the operands.

The result of the addition part of the butterfly operation is outputted from the arithmetic unit 36 and the result of the subtraction part of the butterfly operation is inputted to the serial memory 46. The result of the subtraction part is outputted from the serial memory 46 and the arithmetic unit 36 when the first M/2 points of the next M points to be operated on are inputted to the arithmetic unit 36. The serial memory 46 effectively acts as a delay memory which ensures the correct operands are presented to the adder/subtractor 44 in order to perform an M point butterfly operation. The operation of the arithmetic units 36 is such that when sample points are inputted continuously the serial memory 46 is fully utilised and no inefficient use of available memory space occurs, the memory 46 storing only M/2 points during an M point operation.

The arithmetic unit 36 closest to the left terminal 32 is configured to perform a 256 point butterfly operation, the next unit 36 is configured to perform a 128 point butterfly operation, the next a 64 point butterfly operation and so on down to the arithmetic unit 36 closest to the right terminal 34 which is configured to perform a 2 point butterfly operation. The serial memory 46 of the unit 36 closest to the left terminal 32 is therefore capable of storing 128 complex sample points, the delay memory 46 of the next arithmetic unit 36 is capable of storing 64 sample points, the next 32 sample points and so on to the serial memory 46 of the last arithmetic unit 36 closest to the right terminal 34 which is capable of storing 1 sample point.

The multiplication units 38 each perform n point complex twiddle factor operations on sample points inputted to the units 38. The variable n refers to the number of distinct twiddle factors which the multiplication units 38 are capable of applying to inputted sample points. The multiplication unit 38 closest to the left terminal 32 is configured to perform 4 point twiddle factor operations, the next going towards the right terminal 34, is configured to perform 16 point twiddle factor operations, the next 4 point operations, the next 256 point operations, the next two, 4 and 16 point operations, respectively, and the final multiplication unit 38 closest to the right terminal 34 performs 4 point twiddle factor operations. Depending on their position in the FFT circuit 30, the multiplication units 38 apply their distinct twiddle factors to the incoming sample points in a predetermined order in accordance with the position of the points in N points to be transformed.

The conjugator units 40 conjugate complex sample points inputted to the units 40.

All of the units 36, 38 and 40 include a bus switch which when placed in one state enables data to flow from the left terminal 32 to the right terminal 34 and when placed in another state enables data to flow from the right terminal 34 to the left terminal 32, through the units 36, 38 and 40. The bus switch of each unit 36, 38 and 40 also enables each unit 36, 38 and 40 to be effectively disabled by allowing data on the bus 42 to bypass a selected unit 36, 38 or 40.

To fast fourier transform 256 complex sample points in natural order the bus switches are set so that the sample points are inputted at the left terminal 32, passed sequentially through all of the arithmetic units 36 and multiplication units 38 and outputted at the right terminal 34 in bit reversed order. The conjugator units 40 are bypassed. To transform sample points which are in bit reversed order these are inputted at the right terminal 34 and passed sequentially from right to left through each of the arithmetic units 36 and multiplication units 38 and outputted at the left terminal 32. The sample points at the output 32 appear in a natural order. The conjugators 40 are again bypassed. Regardless of whether the points are transmitted from the left terminal 32 to the right terminal 34 or vice versa, the points are always processed and passed through an arithmetic unit 36 or multiplication unit 38 (or conjugator 40 if not bypassed) in the same direction and manner, and it is merely the direction of travel between successive units 36, 38, 40 which is altered.

To perform an IFFT on 256 sample points data is passed through all of the units 36 and 38 including the conjugator units 40. Data inputted at the left terminal 32 and passed through all of the units 36, 38 and 40 sequentially is inverse transformed and outputted in bit reversed order at the right terminal 34. Data in bit reversed order inputted at the right terminal 34 and passed sequentially through all of the units 36, 38 and 40, from right to left, is inverse transformed and outputted at the left terminal 32 in natural order. To perform a 128 point FFT or IFFT the arithmetic unit 36 and multiplication unit 38 closest to the left terminal 32 must be bypassed and data passed through the remaining units 36 and 38, and through the conjugator units 40 if the inverse transform is to be performed. Generally speaking, to perform an N point transform where N is smaller than 256, greater than 2 and equal to $2^x$ (x being an integer less than 8), the arithmetic units 36 which perform M point: butterfly operations where M is greater than N must be bypassed and the multiplication unit 38 connected on the right hand side of each of the bypassed arithmetic units 36 must also be bypassed.

Thus as the circuit 30 is capable of transferring bit reversed data to transformed natural order data and natural order data to transformed bit reversed data, as described above, the circuit 30 effectively eliminates the bit reversal problems discussed previously.

The provision of the word and vector start lines, mentioned previously, and the configuration and arrangement of the units 36, 38 and 40 of the circuit 30, enable the circuit 30 to function as a pipelined processor and enhance the speed of operation of the circuit 30 compared to known FFT processors.

By virtue of the structure of the arithmetic units 36, the memory space required in the circuit 30 is minimised.

Figure 4:
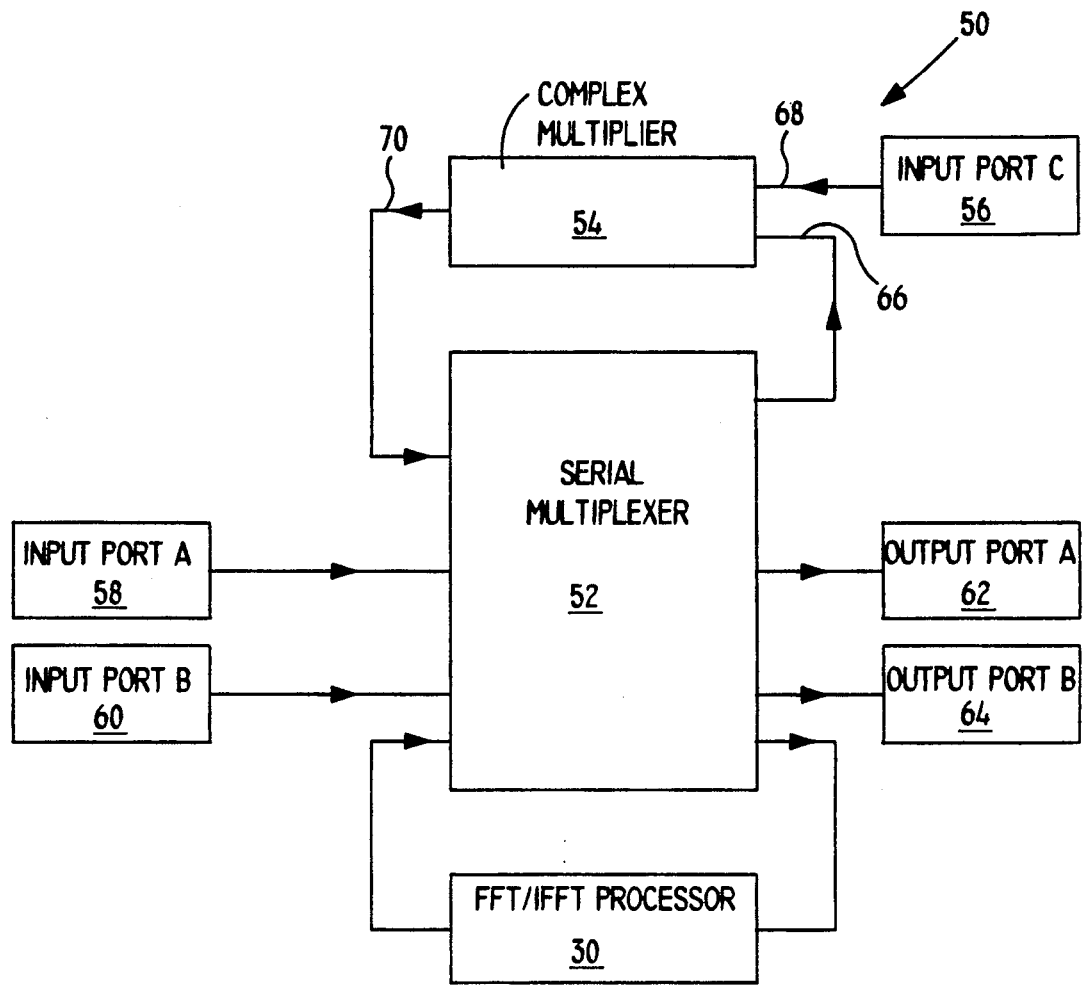
FIG. 4 is a block diagram of a semiconductor chip including the FFT processing circuit of FIG. 3.

The FFT processing circuit 30 is preferably configured, to further improve the speed of operation, in a semiconductor chip 50, as shown in FIG. 4. The chip 50 includes a serial multiplexer 52, a complex multiplier 54, the FFT processing circuit 30, three input ports 56, 58 and 60 and two output ports 62 and 64. The second and third input ports 58 and 60 and the output ports 62 and 64 are provided by two bidirectional input/ouput ports and are connected to the serial multiplexer 52. The serial multiplexer 52 is connected to the FFT processing circuit 30 and passes data to the circuit 30 for transformation and the transformed data is then inputted back to the multiplexer 52. The serial multiplexer 52 is also connected to the complex multiplier 54 so as to pass data to a first input 66 of the multiplier 54. The second input 68 of the multiplier 54 is connected to the first input port 56. The output 70 of the complex multiplier is connected to the serial multiplexer 52. The multiplexer 52 is controllable so as to select data for input to the first input 66 of the complex multiplier 54, the processing circuit 30 and the output ports 62 and 64. The selection is made from data outputted by the multiplier 54, inputted via the input ports 58 or 60, or outputted by the processing circuit 30. The complex multiplier 54 multiplies data inputted on the first input 66 with data inputted on the second input 68 via the first input port 56 and the result is transferred to its output 70.

The FFT processing circuit 30 and the configuration of the chip 50 enable the following operations to be performed at a relatively fast rate:

1. A FFT or IFFT on a vector of complex sample points, x(k) or X(n), respectively.
2. Multiply a vector x(k) or X(n) by a predetermined complex vector inputted via the first input port 56 and then perform a transform, FFT or IFFT, on the result. This is known as a windowing operation.
3. Transform a vector, x(k) or X(n) and then multiply the result of the transform by a predetermined complex vector.
4. Multiplying two complex vectors together.

Figure 5:
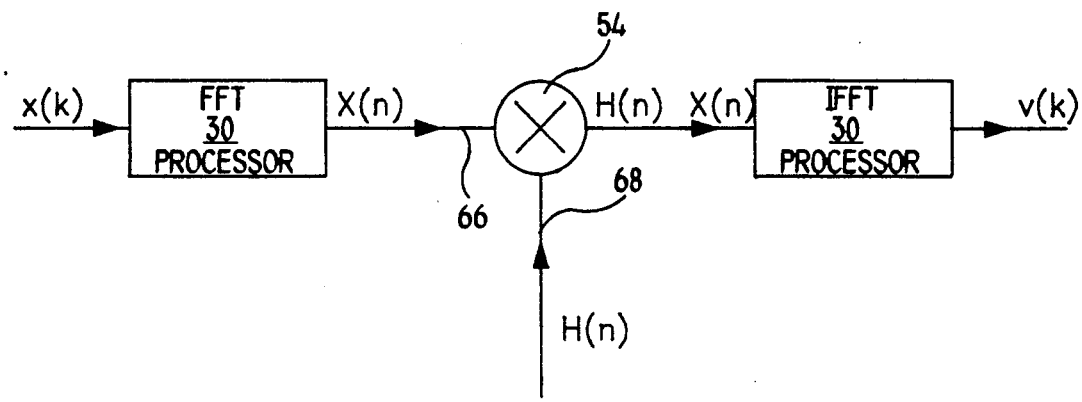
FIG. 5 is a block diagram showing an application of the FFT processing circuit of FIG. 3.

In particular, the processing circuit 30 when used in the chip 50 enables a frequency response or filter function H(n) to be applied to a vector x(k) of complex sample points in the time domain and then obtain a resultant vector v(k) in the time domain which shows the effect of the frequency response H(n) on the vector x(k). This operation is illustrated in FIG. 5 where the vector x(k), in natural order, is fast fourier transformed by the processing circuit 30 to produce the vector X(n) in the frequency domain which is applied to the second input 66 of the complex multiplier 54 whilst the filter function H(n) is also applied to the multiplier 54 via the first input line 68. The result of the multiplication H(n).X(n) is then applied to the processor circuit 30 which performs an IFFT so as to produce the vector v(k) in natural order. Provided the filter function H(n) is supplied to the multiplier 54 in bit reversed order there is no need to reorder the data at any stage and the operation is pipelined. Although FIG. 5 illustrates two processing circuits 30, both the FFT and IFFT of the operation may be performed by the processing circuit 30 of one chip 50.

Figure 6:
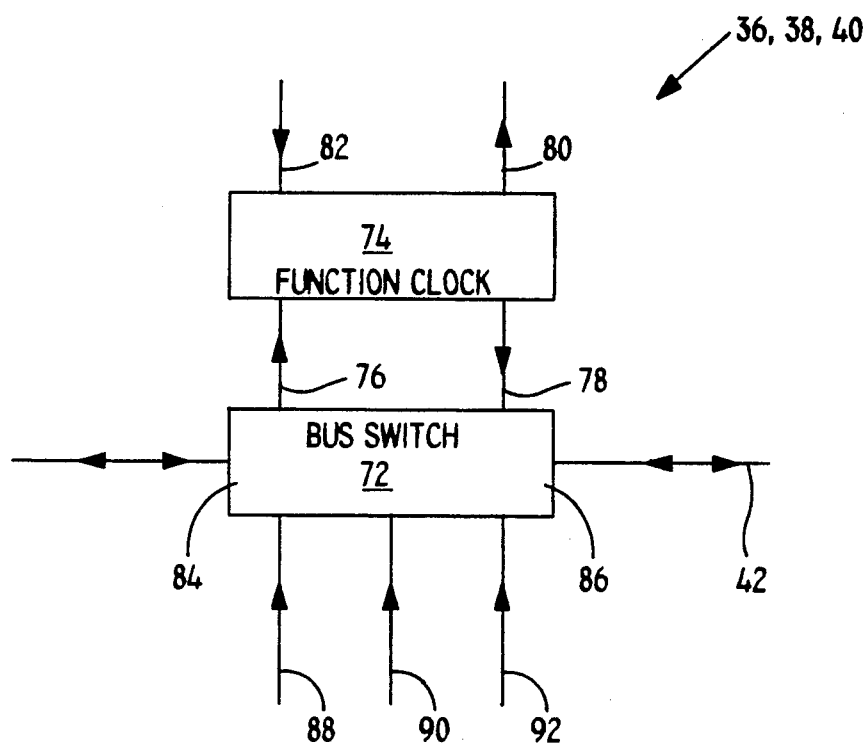
FIG. 6 is a block diagram of arithmetic, multiplication and conjugator units of the FFT processing circuit.

The arithmetic units 36, multiplication units 38, and conjugator units 40 each comprise a bus switch 72, as mentioned previously, and a function block 74 connected to the bus switch 72 via 4 bit data input lines 76 and 4 bit data output lines 78, as shown in FIG. 6. The function block 74 performs the respective butterfly operations, twiddle factor operations and conjugator operations in the units 36, 38 and 40 on data being inputted on the input lines 76 and places the results of the operations on the output lines 78. The function block 74 also includes an overflow output line 80 which is connected to an overflow latch in the block 74 that is internally latched whenever data overflow occurs as a result of one of the operations. The function block 74 also includes a reset input line 82 which is used to reset the overflow latch.

The bus switch 72 has left and right terminals 84 and 86, respectively, which are connected to the bus 42. The bus switch 72 also includes 3 input lines, a bypass line 88, a scale line 90 and a direction line 92. The state of the bypass line 88 determines whether or not data on the bus 42 is to be applied to the function block 74 or if data is to bypass the function block 74. The state of the direction line 92 determines whether data is to be inputted via the right terminal 86 and outputted via the left terminal 84 on the bus 42 or if data is to be inputted at the left terminal 84 and outputted on the data bus 42 via the right terminal 86. The state of the scale line 90 determines whether or not data inputted to the bus switching unit 72 is to be scaled down in value, for example by dividing the value of the real and imaginary words inputted by two.

Figure 7:
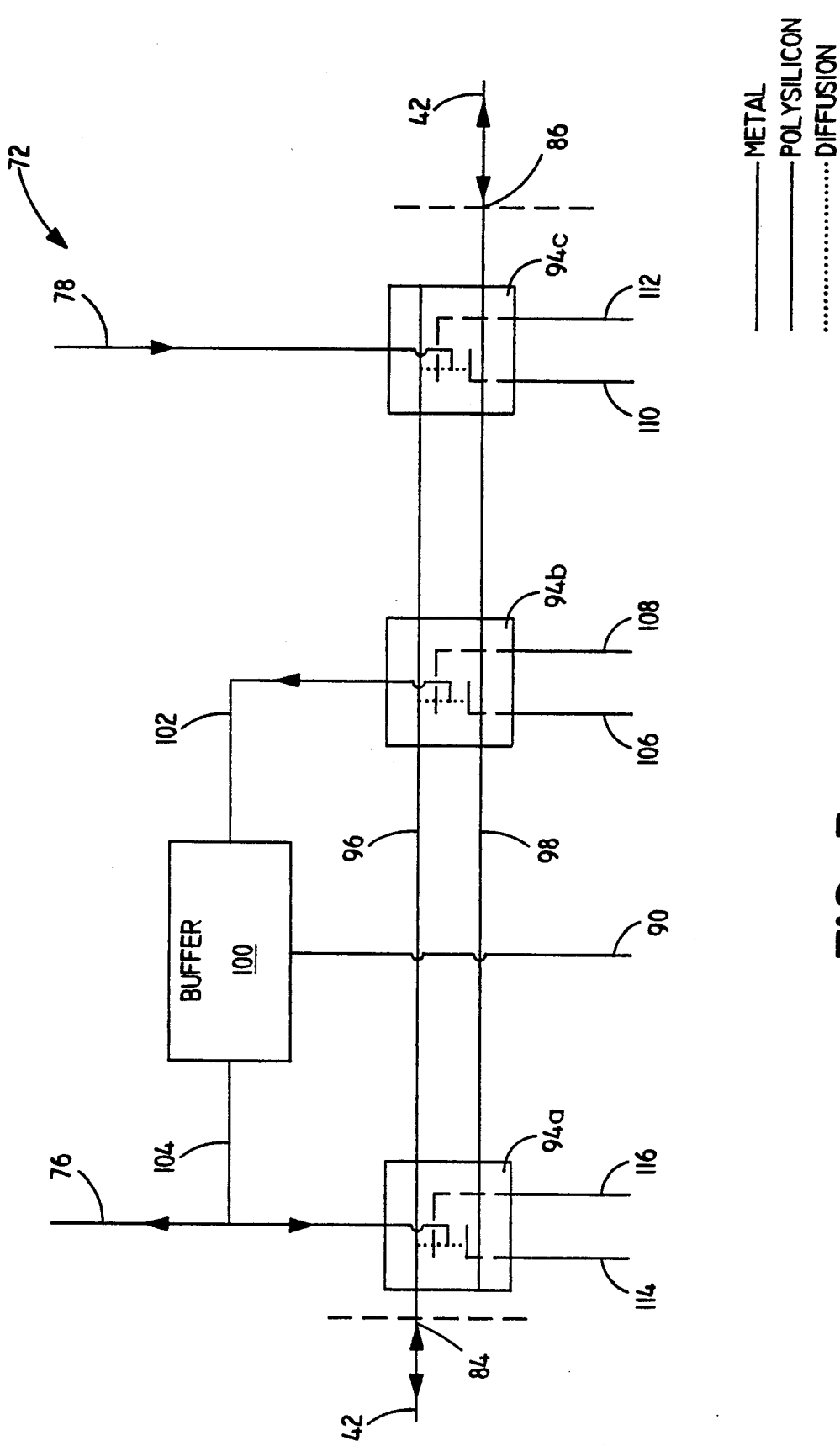
FIG. 7 is a diagram of a bus switch of the FFT processing circuit.

The bus switch 72, as shown in more detail in FIG. 7, comprises three switching cells 94, top and bottom 4 bit data buses 96 and 98, respectively, which are connected to the switching cells 94, and a buffer 100 which incorporates a scale unit. The top bus 96 is connected to the left terminal 84 of the bus switch 72 and the bottom bus 98 is connected to the right terminal 86 of the bus switch 72.

The second switching cell 94b is connected to the input 102 of the buffer 100 and is used to input data from the top bus 96, or the bottom bus 98, to the buffer 100. The second switching cell 94b is controlled by two control lines RIGHTIN 106 and LEFTIN 108. When RIGHTIN 106 is high data is inputted to the buffer 100 via the bottom bus 98 and when LEFTIN 108 is high data is inputted to the buffer via the top bus 96.

The output 104 of the buffer 100 is connected to the function block input lines 76 and the first switching cell 94a. All data inputted on the buffer 100 is outputted on its output 104. The scale unit in the buffer 100 is activated when the scale input line 90 is enabled. When activated the buffer 100 divides real and imaginary words inputted to the buffer 100 by a factor of two.

The function block output lines 78 are connected to the third switching cell 94c, as shown in FIG. 7, and the cell 94c is controlled by two control lines FUNCTRIGHT 110 and FUNCTLEFT 112. Whenever FUNCTRIGHT 110 or FUNCTLEFT 112 is high data is accepted from the function block output lines 78 and passed to the processing circuit data bus 42. If FUNCTRIGHT is high data is passed to the bottom data bus 90 and if FUNCTLEFT is high data is passed to the top bus 96. When data is not to be accepted from the function block input line 78 and a respective function block 74 is to be bypassed one of the control lines THRURIGHT 114 or THRULEFT 116 which control the first switching cell 94a is enabled. When THRURIGHT 114 is high data outputted from the buffer 100 is passed to the bottom bus 98 and when THRULEFT 116 is high data outputted from the buffer 100 is passed to the top bus 96. The signals for the control lines 106, 108, 110, 112, 114 and 116 of the switching cells 94 are derived from the state of the bypass and direction lines 88 and 92.

Figure 8:
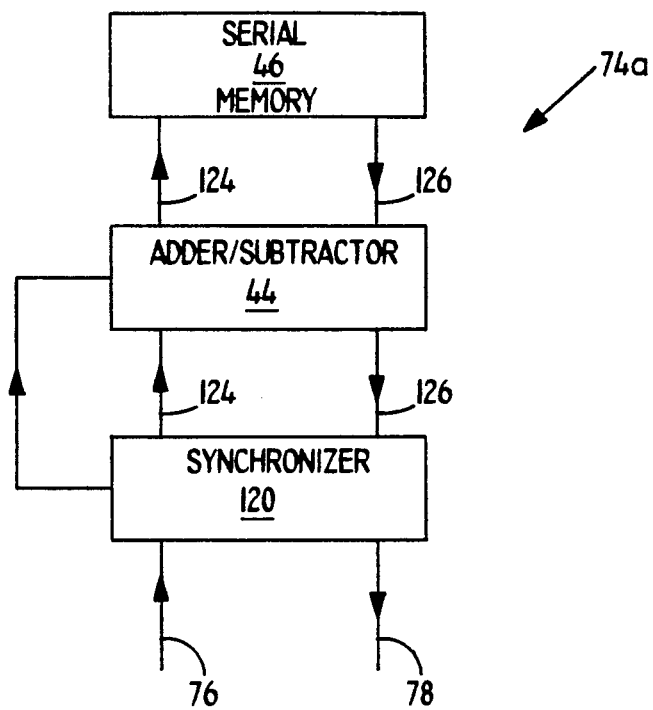
FIG. 8 is a block diagram of the function block of an arithmetic unit of the FFT processing circuit.

The function block 74a of the arithmetic units 36, as shown in FIG. 8, includes a serial memory 46, an adder/subtractor 44, and a synchronizer 120. The synchroniser 120 is connected to the function block input and output lines 76 and 78 and ensures that the flow of data in the adder/subtractor 44 and the serial memory 46 is synchronised using control lines 122. The serial memory 46, adder/subtractor 44 and the synchronizer 120 are interconnected by 2 bit input lines 124 and 2 bit output lines 126.

Figure 9:
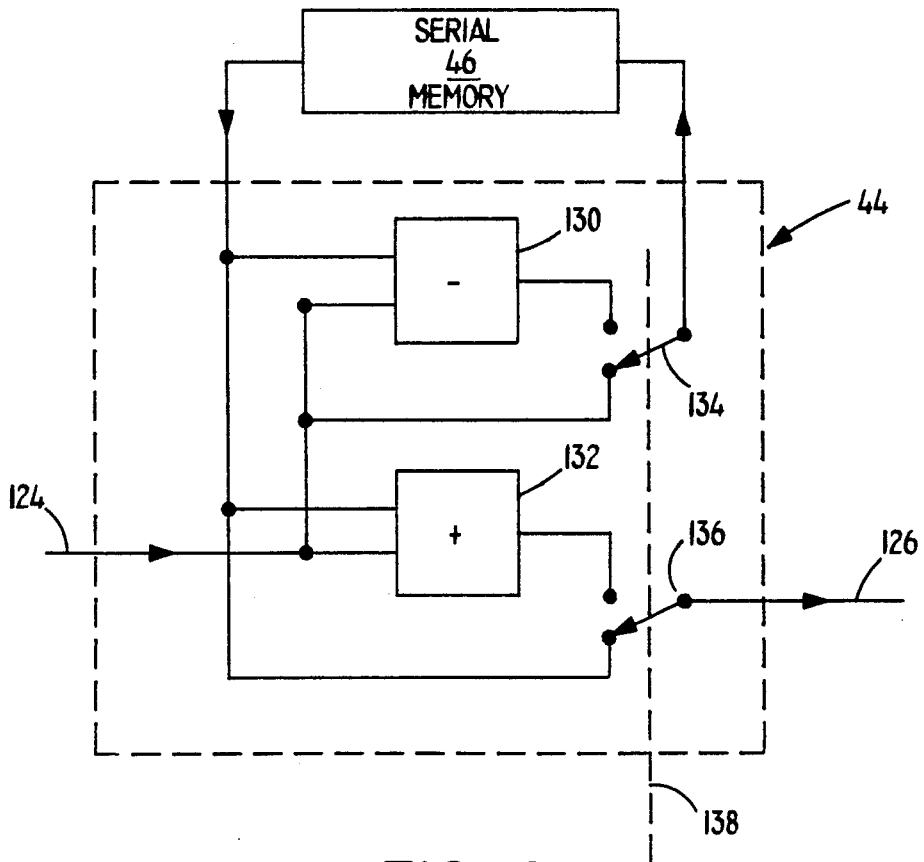
FIG. 9 is a more detailed diagram of the function block of FIG. 8.

The adder/subtractor 44, as shown in more detail in FIG. 9, comprises a subtractor 130 and an adder 132 having one input each connected to the two bit input lines 124 of the adder/subtractor 44. The second inputs of the subtractor 130 and the adder 132 are connected to the output of the serial memory 46. The adder/subtractor 44 also includes a first switch 134 and a second switch 136 which are controlled by a control line FIRST 138. When FIRST 138 is in one state the switches 134 and 136 are positioned, as shown in FIG. 9, so as to pass data inputted on the input lines 124 of the adder/subtractor 44 to the input of the serial memory 46 and output data stored in the serial memory 46 to the output lines 126 of the adder/subtractor 44. The FIRST control line 138 is in this state when the first M/2 sample points of the M points on which a butterfly operation is to be formed are inputted via the input lines 124. When the FIRST control line 138 is in a complementary second state the switches 134 and 136 are positioned so as to connect the output of the subtractor 130 to the input of the serial memory 46 and connect the output lines 126 of the adder/subtractor 44 to the output of the adder 132. The FIRST control line 138 is placed in this second state when the second M/2 points of M points on which a butterfly operation is to be performed are inputted via the input lines 124. Once all of the M points have been inputted to the adder/subtractor 44 the FIRST line 138 is returned to the first mentioned state and the results of the subtractions performed by the subtractor 130 are outputted from the serial memory 46 to the output lines 126 of the adder/subtractor 44. The state of the FIRST control line 138 is controlled by the synchroniser 120.

Figure 10:
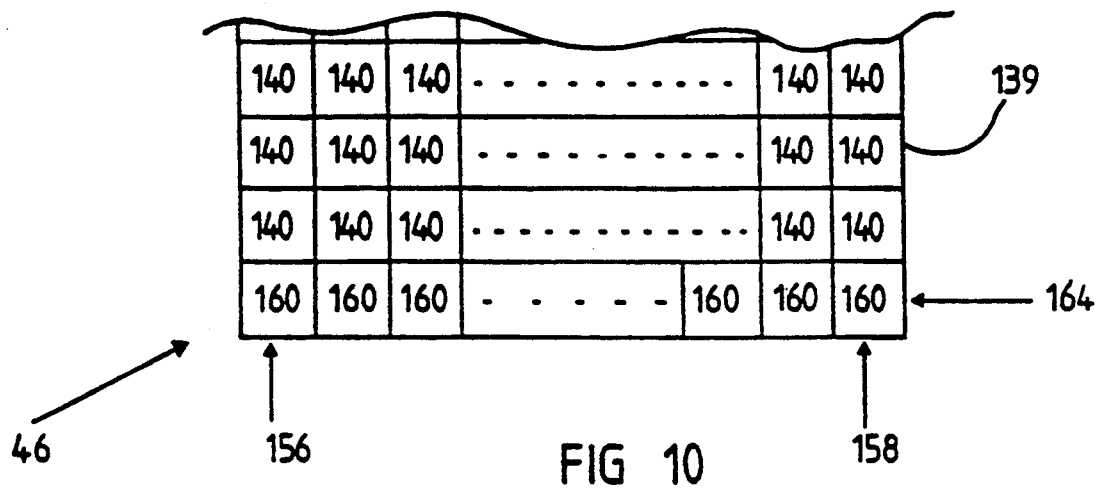
FIG. 10 is a diagram of a serial memory of the FFT processing circuit.

The serial memory 46, as shown in FIG. 10, comprises a k×l array 139 of memory cells, each capable of storing a bit of data. The variables k and l are integers representing the number of rows of memory cells and the number of columns of memory cells, respectively.

Figure 11:
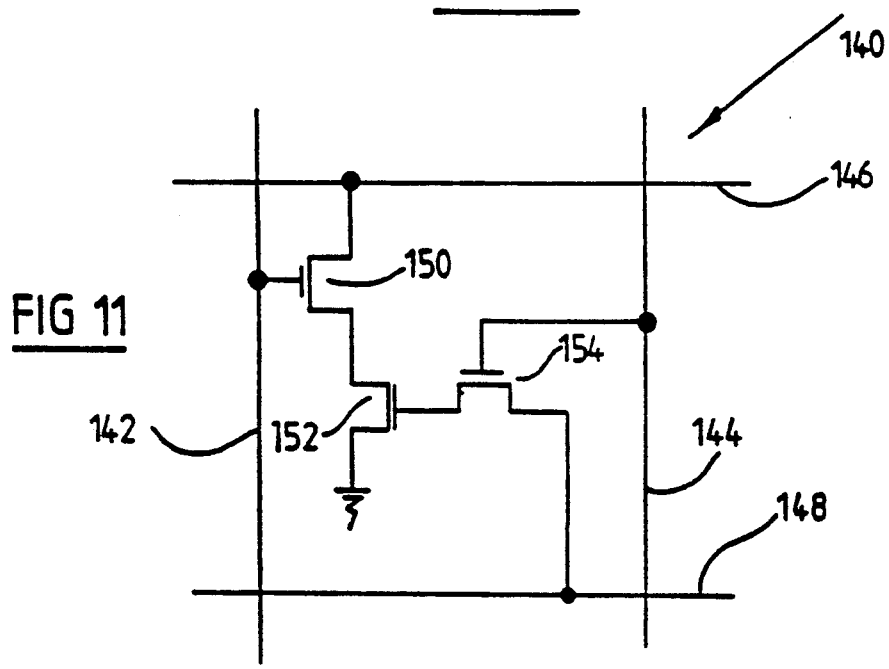
FIG. 11 is a circuit diagram of a RAM cell of the serial memory of FIG. 10.

The array 139 mainly includes standard random access memory cells 140, as shown in FIG. 11. The RAM memory cell 140 includes a READ line 142, a WRITE line 144, a BITREAD line 146, a BITWRITE line 148 and three FETs 150, 152 and 154. The gate of the first transistor 150 is connected to the READ line 142, the drain to the BITREAD line 146 and the source to the drain of the second transistor 152. The second transistor 152 has its source earthed and its gate is connected to the drain of the third transistor 154. A bit stored in the cell 140 is stored on the gate of the second transistor 152. The third transistor 154 has its gate connected to the WRITE line 144 and its source connected to the BITWRITE line 148. A bit of data is inputted to the cell 140 via the BITWRITE line 148 whenever the WRITE line is high. A bit stored in the cell 140 is outputted on the BITREAD line 146, which is precharged before a read operation is performed, whenever the READ line 142 is high.

The memory cells 140 are interconnected to one another in the array 139 of the serial memory 46 so that the BITREAD line 146 of one cell 140 acts as the BITWRITE line 148 of the cell 140 above it. The READ line 142 of one cell 140 also acts as the WRITE line 144 of cells 140 to the left of the first mentioned cell 140. This interconnection ensures that the serial memory 46 acts as a shift register wherein when a bit is read out of a cell 140 it is transferred to a cell above and to the left of the first mentioned cell 140. Enabling the READ line 142 effectively causes data to be shifted up one row and across one column in the array 139. In other words, a bit of data is transferred diagonally from one cell 140 to another cell 140. The memory 46 could be seen as being arranged like a cylinder with the first column 156, when words having the maximum word length are stored, being connected to the right column 158 for the transfer of data. The first column 156 is shifted up one row and across to the end column 158 when the READ line 142 of the first column 156 is enabled and the WRITE line 144 of the end column 158 is enabled.

The array 139 is able to store k words having a maximum word length of (l−1) bits. An extra column is provided because the cells 140 cannot be read and written to simultaneously. After a read/write operation, the columns either side of an enabled READ/WRITE control line 142, 144 contain the same data, with the newly written column on the left being shifted up one row with respect to the read column on the right. Data is shifted through the memory 46 by propagating from left to right high read/write pulses across the READ/WRITE control lines 142, 144. The read/write pulses are separated by a number of low pulses, the number being equal to the length of the data words which are to be shifted through the memory 46. Thus, if the words have the maximum length of (l−1) bits, the pulses are separated by (l−1) low pulses, or O's.

In general, a column to the right of a high READ/WRITE line 142, 144 has its contents written to a column to the left. For storage of words having the maximum word length, this results in the cylindrical arrangement discussed previously, whereby the READ line 142 of the first column 156 and the WRITE line 144 of the end column 158 are enabled simultaneously. If the word length of words stored is reduced from (l−1) to q, say, the number of low pulses separating the read/write pulses is reduced accordingly to q, and when the first column 156 is read its contents are no longer written to the end column 158 but to a column q positions to the right of the first column 156. The circumference of the conceptual cylinder is thereby decreased.

Figure 12:
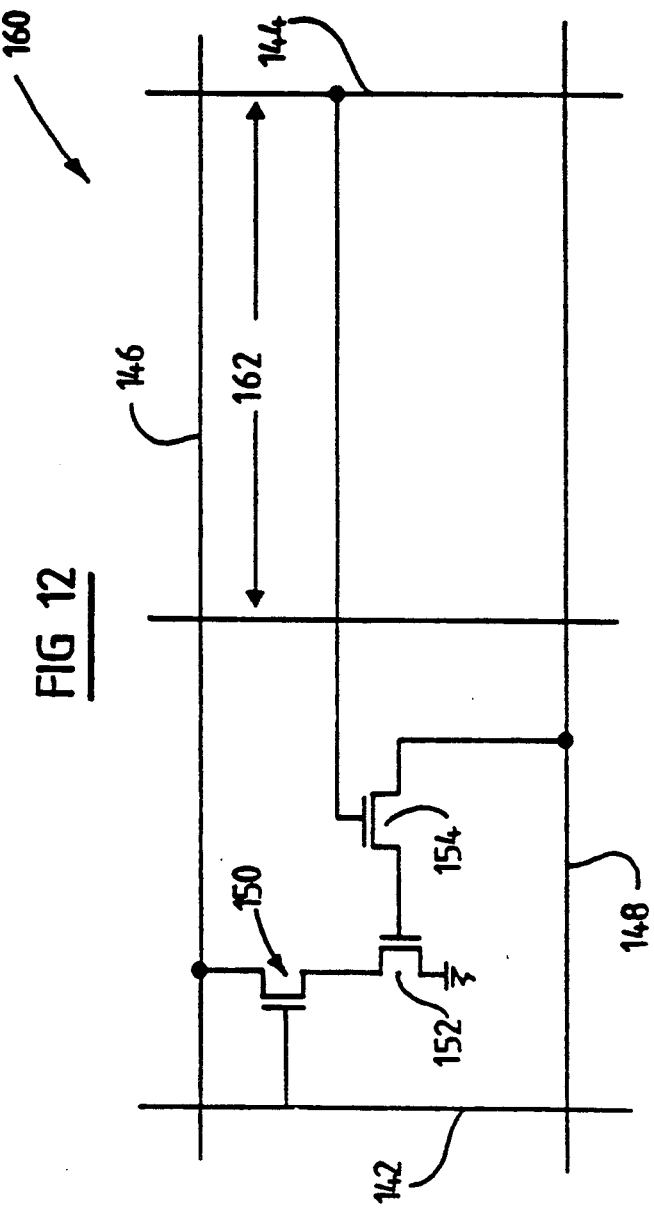
FIG. 12 is a circuit diagram of a modified RAM cell of the serial memory of FIG. 10.

A modified memory cell 160, as shown in FIG. 12, has the same control and data transfer lines 142, 144, 146 and 148 and the same arrangement of FETs 150, 152 and 154 as the standard memory cell 140, however, the WRITE line 144 is shifted one cell space 162 to the right so that the modified memory cell 160 occupies the same space as two standard memory cells 140.

The modified memory cells 160 are placed in the bottom row 164 of the array 139 of the serial memory 46 and each modified cell 160 overlaps one another with the FETs 150, 152 and 154 of the one cell 160 being placed in the spare cell space 162 of another modified cell 160. The WRITE line 144 of the modified cell 160 in the end column 158 extends outside the symmetrical configuration of the array 139. Thus the read/write control word sent to the READ/WRITE control lines 142, 144 comprises (l+2) bits. The cells 160 of the bottom row 164 transfer data up one row and across two cells 140 to the left instead of one cell. The input and output interfaces of the memory 46 add an extra one bit delay and without the bottom row 164 of modified cells 160, the total delay for propagation of a bit through the memory 46 would be the number of rows times the number of low pulses between the read/write pulses plus one, i.e. (k×word length)+1. The modified cells 160 reduce this delay by 1 so making it possible to acheive delays in multiples of the number of rows, such that the word length can be easily varied.

Figure 13:
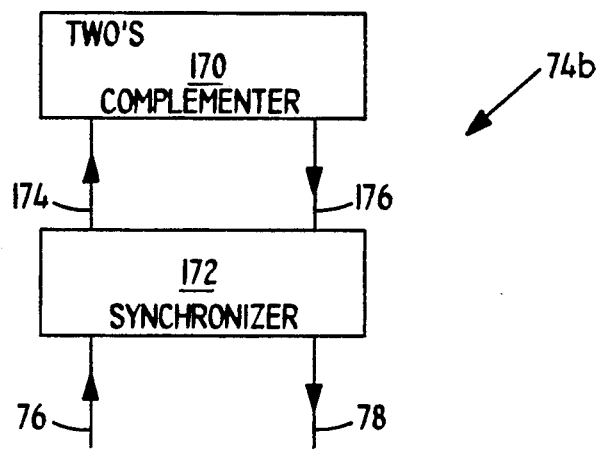
FIG. 13 is a block diagram of a function block of a conjugator unit of the FFT processing circuit.

The function block 74b of a conjugator unit 40, as shown in FIG. 13, comprises a two's complementer 170 and a synchroniser 172. The synchroniser 172 synchronises data flow in the function block 74b and outputs imaginary words via a one bit output line 174 to the two's complementer 170, which performs a two's complement operation on the imaginary words. The synchronizer 172 receives the complemented imaginary words from the two's complementer 170 via an input line 176.

Figure 14:
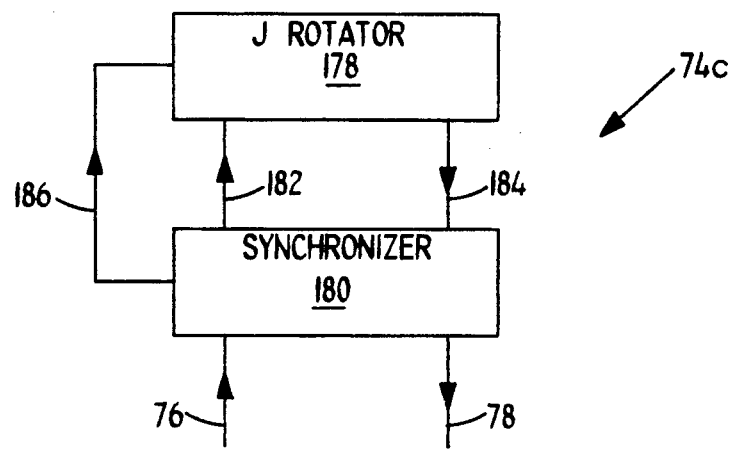
FIG. 14 is a block diagram of a function block of a 4 point multiplication unit of the FFT processing circuit.

The function block 74c of the four point multiplication unit 38, as shown in FIG. 14, comprises a j rotator 178 and a synchroniser 180 connected to the j rotator 178 via two bit output lines 182 and two bit input lines 184. The synchroniser 180 synchronises the flow of data in the function block 74c using a LAST control line 186. Complex words are passed to the j rotator 178 via the synchronizer 180 and when the LAST control line 186 is enabled a complex word inputted to the j rotator 178 is rotated by 90°. The j rotator 178 multiplies selected complex words by −j and places the results on the output lines 184.

Figure 15:
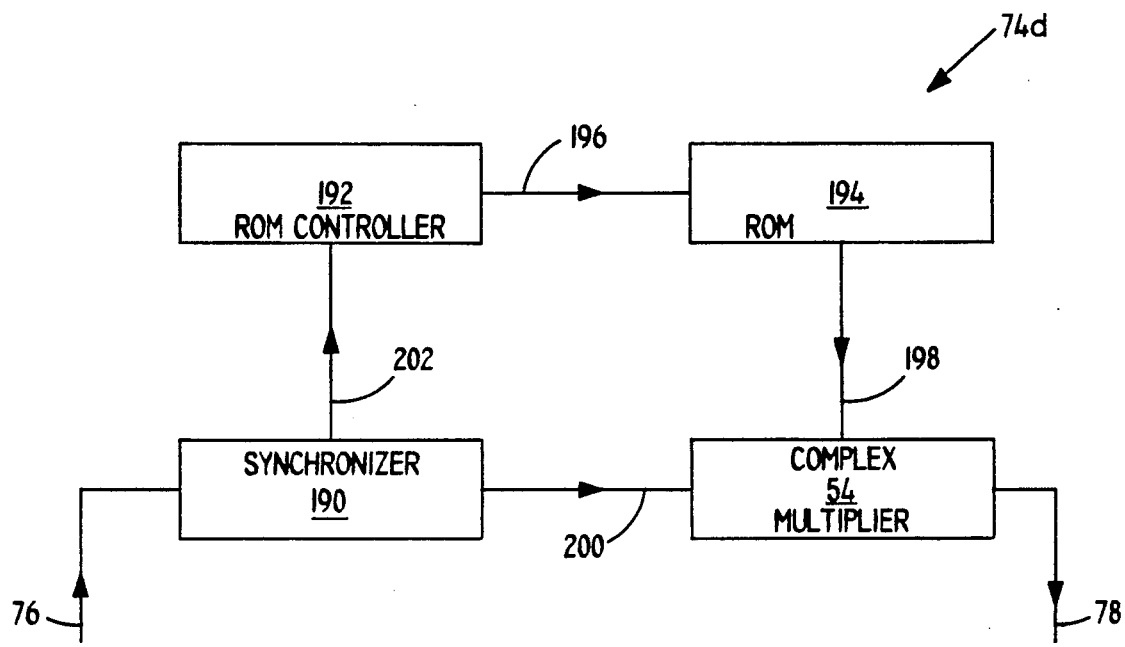
FIG. 15 is a block diagram of a function block of a 16 point multiplication unit of the FFT processing circuit.

The function block 74d of the 16 point multiplication unit 38, as shown in FIG. 15, comprises a synchroniser 190 connected to the function block input lines 76, a ROM controller 192, a 16 word ROM 194 and a complex multiplier 54. The ROM 194 stores appropriate complex twiddle factors which need to be applied to complex words inputted to the function block 74d via the input lines 76. The ROM 194 is accessed by the controller 192 via a 9 bit bus 196 so as to output the appropriate complex twiddle factors to the multiplier 54 via a 2 bit bus 198. The twiddle factors are multiplied by complex words inputted to the multiplier 54 by a four bit data bus 200 with the result outputted on the function block output lines 78. The synchroniser 190 synchronises data flow in the function block 74d and delays inputted complex words for a predetermined time so as to allow the ROM controller 192 to access an appropriate complex twiddle factor from the ROM 194. The synchroniser 190 ensures that complex words are submitted to the multiplier 54 via the bus 200 in phase with complex twiddle factors submitted via its output bus 198. The synchronizer 190 also enables the ROM controller 192 by an enable line 202.

Figure 16:
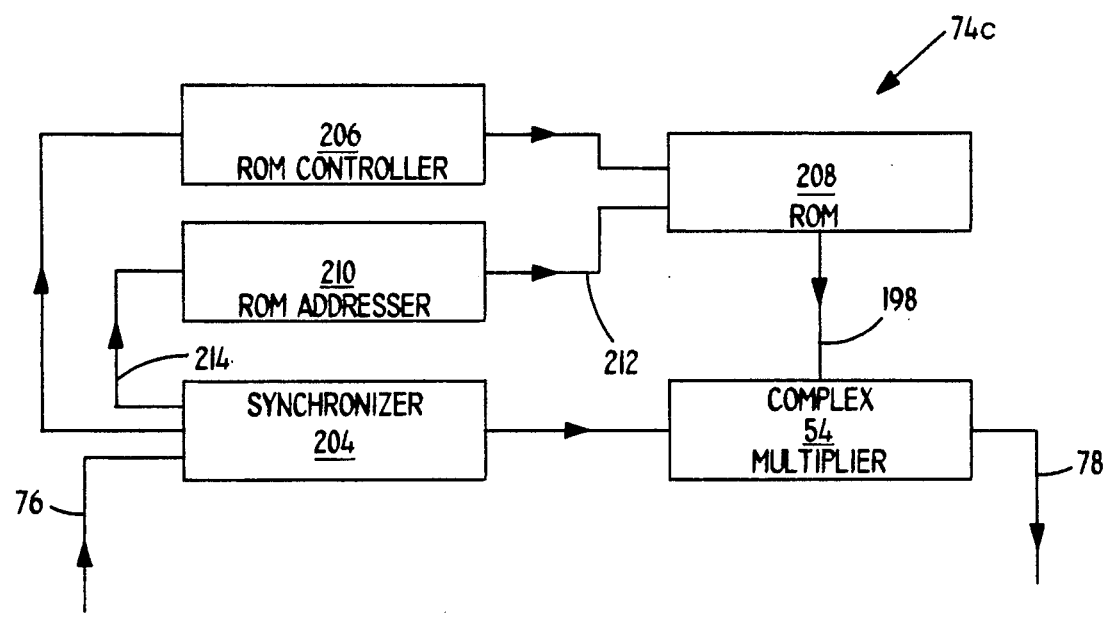
FIG. 16 is a function block of a 256 point multiplication unit of the FFT processing circuit.

The function block 74e of the 256 point multiplication unit 38, as shown in FIG. 16, includes a synchroniser 204, a ROM controller 206, a 256 word ROM 208, for storing appropriate complex twiddle factors, a complex multiplier 54 and a ROM addresser 210. The function block 74e of the 256 point multiplication unit 38 is essentially the same as the function block 74d of the 16 point multiplication unit 38 and operates in the same manner, except the function block 74e includes the ROM addresser 210 which is used to address the ROM 208 via an address bus 212, when accessing an appropriate complex twiddle factor. The ROM addresser 210 is enabled by the synchronizer 204, using an enable line 214.

The complex multipliers 54, described previously, are configured to multiply two complex numbers which are represented by complex words inputted bit-serially to the multiplier 54. One word may represent a complex number $a+jb$ and another word may represent a predetermined complex coefficient $x+jy$ and the result of the complex multiplication $(ax-by)+j(bx+ay)$ is outputted bit-serially by the multiplier 54. In order to reduce the number of shift registers which are required the multiplier 54 uses the same control lines to control i-n parallel the transfer of the complex word $a+jb$, the transfer of the complex coefficient word $x+jy$ and generation of the sub-products $ax$, $by$, $bx$ and $ay$. The multiplier 54 performs the necessary four multiplications $ax$, $by$, $bx$ and $ay$ simultaneously and at the last stage of the multiplier 54 the necessary addition and subtraction operations are performed so as to produce the complex product.

The multiplier 54 in calculating the sub-products ax, by, bx and ay calculates a number of partial products by multiplying a word a or b by a bit of a word x or y. The first partial products calculated are added to form a partial sum which is then added to the next partial product generated so as to form a new partial sum. The final partial sum generated is the desired sub-product ax, by, bx or ay. The multiplier 54 prevents overflow into the sign bit of the partial sums by performing a sign extension operation. The sign extension operation can be performed by performing an OR operation on the most significant bit of the last partial sum generated and the most significant bit of the new partial product generated before a new partial sum is generated. The result of the OR operation is then retained as the sign bit for the new partial sum. The sign extension operation can also be performed by performing the following boolean operation PPS.PP+PP.C̄+PPS.C̄, PPS being the most significant bit of the last partial sum, PP being the most significant bit of the generated partial product and C being the carry from the calculation of the second most significant bit of the last partial sum. The result is then retained as the sign bit for the new partial sum. The OR operation is only applicable when the multiplier 54 does not have to add additional values, such as is required when rounding the final product, for example. The boolean operation however is always applicable and is the preferred operation.

Figure 17:
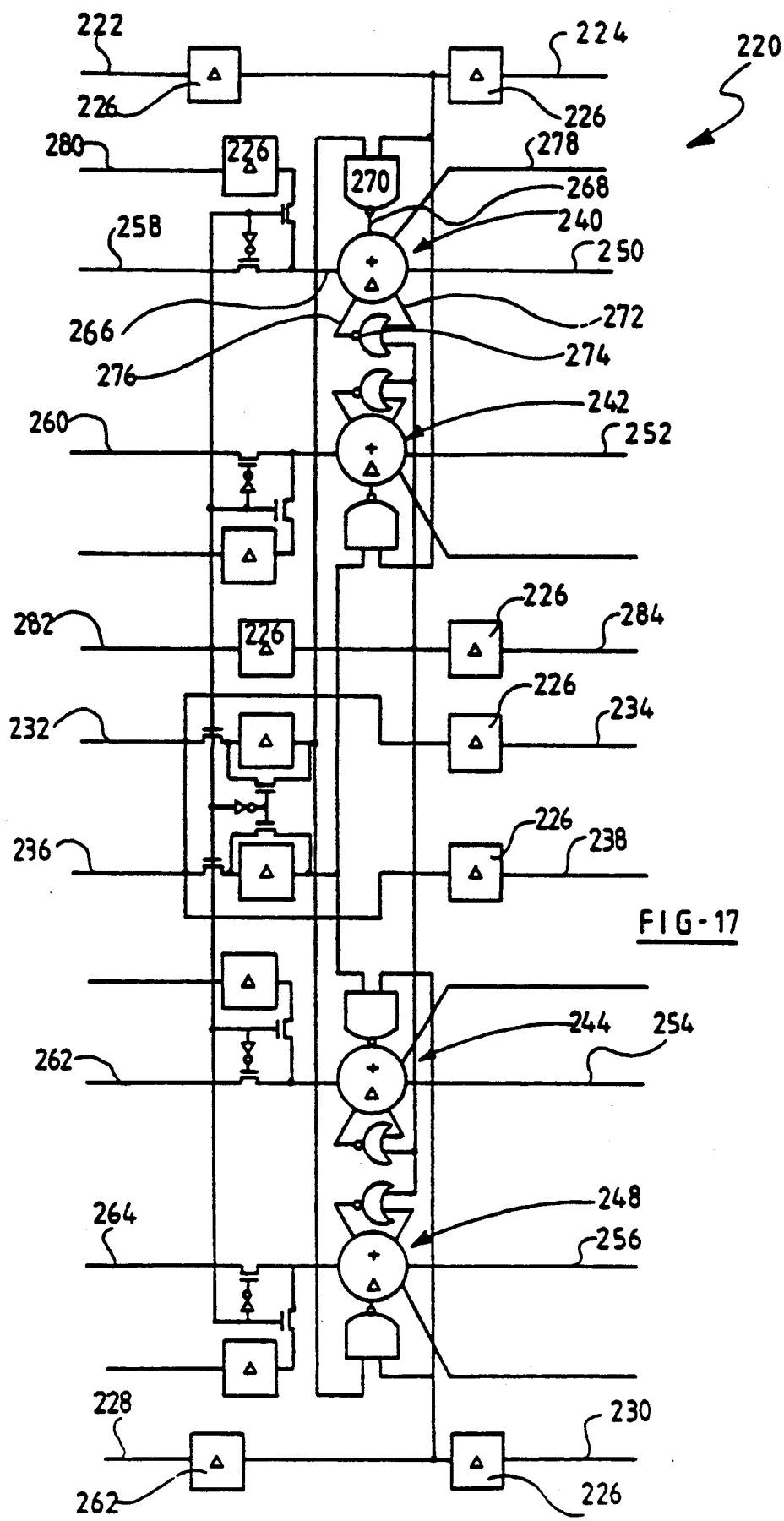
FIG. 17 is a diagram of a multiplier cell of a complex multiplier of the FFT processing circuit of FIG. 3 and the chip of FIG. 4.

The multiplier 54 includes a number of multiplier cells 220, as shown in FIG. 17, one for each bit in the complex word which represents x+jy to be multiplied. The cells 220 are connected in cascade and generate the sub-products ax, by, bx and ay in a pipeline fashion. The multiplier cell 220 is configured as shown in FIG. 17 and the real word a is inputted to the cell 220 on the input line 222 and is outputted on the output line 224 after being passed through two delay units 226. Similarly the imaginary word b is serially inputted to the cell 220 by an input line 228 and is outputted after being passed through two delay units 226 on an output line 230. The real word x of the coefficient is serially inputted on an input line 232, passed through only one delay unit 226 and outputted on an output line 234 to the next cell 220. Similarly the imaginary word y of the coefficient is inputted on an input line 236, passed through one delay unit 226 and outputted to the succeeding cell 220 on an output line 238. The multiplier cell 220 also includes four adder units 240, 242, 244 and 248 which serially calculate the partial sums of the sub-products ax, ay, by and bx, respectively. The partial sums generated by the adders 240, 242, 244 and 248 are outputted serially on output lines 250, 252, 254 and 256, respectively, for input to the next cell 220 on input lines 258, 260, 262 and 264, respectively. As shown with respect to the first adder 240, each adder 240, 242, 244 and 248 receives two operands via respective inputs 266 and 268, the second being connected to the output of a respective NAND gate 270. The adders 240, 242, 244 and 248 each include a respective carry output 272 applied to the input of a respective NOR gate 274, and a respective carry input 276 which is taken from the output of the NOR gate 274. The adders 240, 242, 244 and 248 also each perform the sign extension operation, described previously, and output the result on a respective sign extension output 278. The sign extension output 278 is applied to the succeeding cell 220 via an input line 280. The word line, described previously, which indicates when the start of a word is inputted to the multiplier cell 220, is inputted on an input line 282, passed through two delay units 226 and outputted on an output line 284.

The words which represent the coefficients a, b, x and y are inputted serially to the row of multiplier cells 220 with their least significant bits first. By virtue of the timing difference created by delaying the bits of the coefficients a and b with respect to the bits of the coefficients x and y, as the bits are propagated through the cells 220, the four NAND gates 270 perform one bit multiplication operations so as to calculate part of each partial product. The result of the one bit multiplication is inputted to a respective one of the adders 240 which add the result to a particular bit of a previously calculated partial sum. A detailed description of the basic theory associated with the operation of the multiplier cells 220 is provided in a paper by Mr. R. F. Lyon entitled Twos-Complement Pipeline Mulitpliers, IEEE Transactions of Communications, April 1976.

We claim:

1. A transform processing circuit comprising:
   first and second input/output terminals, said first input/output terminal inputting data in a first order, said second input/output terminal inputting data in a second order; and
   a plurality of processing units connected in series between said input/output terminals;
   with said data inputted by said first input/output terminal in said first order being passed through said units sequentially, transformed and outputted at said second terminal in said second order, and with said data inputted by said second input/output terminal in said second order being passed through said units sequentially, transformed and outputted at said first terminal in said first order.

2. A transform processing circuit as claimed in claim 1, wherein said processing units include means for setting the direction in which data passes through said circuit.

3. A transform processing circuit as claimed in claim 2, wherein said first order is natural order and said second order is bit reversed order.

4. A transform processing circuit as claimed in claim 3, further comprising a data bus which connects said units in series and is connected at one end to said first terminal and at the other end to said second terminal, wherein said means comprises bus switching means which in a first state, is such that data inputted in natural order at said first terminal is transformed by said units and outputted at said second terminal in bit reversed order, and in a second state, is such that data inputted at said second terminal in bit reversed order is transformed by said units and outputted at said first terminal in natural order.

5. A transform processing circuit as claimed in claim 4, for performing an N point FFT on data inputted serially thereto, said data being representative of N sample points and N being equal to $2^n$ where n is a positive integer greater than 1, wherein said processing units include:
   n arithmetic units for performing butterfly operations on said data; and
   (n−1) multiplication units for performing predetermined complex multiplications on said data, one of said multiplication units being connected between each adjacent pair of said arithmetic units;
   said units each including said bus switching means which can be set in said first state, such that said data outputted in natural order at said first terminal is transformed by said units and outputted at said second terminal in bit reversed order, and said second state, such that said data inputted at said second terminal in bit reversed order is transformed by said units and outputted at said first terminal in natural order.

6. A transform processing circuit as claimed in claim 5, further comprising first and second conjugator units connected respectively to said first and second terminals and in series with said arithmetic and multiplication units, wherein said conjugator units, when enabled, conjugate said data such that said data on being outputted from said first or second terminal is inverse transformed by said circuit according to an N point inverse FFT, and then disabled, said data is transformed according to said FFT.

7. A transform processing circuit as claimed in claim 5 or 6, wherein said units each comprise:
a function block for processing data received thereby having input lines and output lines; and
said bus switching means, which is connected to said input lines and said output lines and has first and second bus terminals;
said bus switching means of said units being connected in series by said bus, which comprises a plurality of portions that connect the first bus terminals to said first input/output terminal and the second bus terminal of a lasting switching means to said second input/output terminal.

8. A transform processing circuit as claimed in claim 7, wherein said bus switching means is controlled in response to the state of a direction line such that when said direction line is placed in one state, data is received on said first bus terminal and outputted on said second bus terminal and when said direction line is placed in another state data is received on said second bus terminal and outputted on said first bus terminal.

9. A transform processing circuit as claimed in claim 8, wherein said bus switching means is also controlled in response to the state of a respective bypass control line connected thereby such that when said bypass control line is in one state data received by said switching means on one of said bus terminals is outputted for processing on said input lines to the respective function block and thereafter inputted on said output lines and outputted on the other one of said bus terminals, and when said bypass line is in another state data received on said one of said bus terminals is passed directly to said other one of said bus terminals.

10. A transform processing circuit as claimed in claim 9, wherein said bus switching means includes a buffer through which data received by said switching means passes and which reduces the value represented by the data when a scale signal is received on a scale line connected thereto.

11. A transform processing circuit as claimed in claim 10, wherein said bus switching means further comprises:
a first bus connected to said first bus terminal;
a second bus connected to said second bus terminal;
a first switch which is connected to said buffer and said first and second buses and selectively passes data on said fix bus or said second bus to the input of said buffer in response to the state of said direction line, the output of said buffer being connected to said input lines;
a second switch, which is connected to said first and second buses and the output of said buffer and selectively places data outputted by said buffer on said first bus or said second bus in response to the state of said direction line when said bypass line is in said another state; and
a third switch which is connected to said output lines and said first and second buses and selectively places data received on said output lines on said first bus or said second bus in response to the state of said direction line when said bypass line is in said one state.

12. An integrated circuit comprising:
a processing circuit as claimed in claim 1;
at least one input port;
at least one output port;
an independent complex multiplier having two inputs and which multiplies two operands represented by data inputted on said inputs, respectively;
a further input port connected to one input of said independent complex multiplier; and
a multiplexer which transmits data received from the first or second input/output terminal of said processing circuit, said at least one input port, or the output of said independent complex multiplier to said at least one output port, or the output of said independent complex multiplier to said at least one output port, the other input of said independent complex multiplier or the first or second input/output terminal of said processing circuit.

13. A transform processing circuit as claimed in claim 5, wherein each arithmetic unit is adapted perform an M point butterfly operation, M being equal to $2^m$ where m is a positive integer determined by the position in which said arithmetic unit is connected in said circuit, and each includes:
a serial memory adapted to store data representative of M/2 sample points; and
an adder/subtractor connected to said serial memory;
said arithmetic unit being such that the serial memory stores the first M/2 points received by said unit of M sample points to be operated on, the second M/2 points are then inputted as first operands to said adder/subtractor and the first M/2 points are outputted from said serial memory as second operands to said adder/subtractor, which performs an addition and a subtraction operation on said first and second operands, and the resultant sums and differences are then outputted from said arithmetic unit.

14. A transform processing circuit as claimed in claim 13, wherein M/2 of said resultant sum and differences are outputted directly from said arithmetic unit and the other M/2 are stored in said serial memory and outputted from said arithmetic unit thereafter.

15. A transform processing circuit as claimed in claim 14, wherein said adder/subtractor includes at least one input line for receiving said M sample points, at least one output line for outputting said resultant sum differences, an adder for performing said addition operation and a subtractor for performing said subtraction operation, said adder and said subtractor both having a first input connected in parallel to the output of said serial memory and a second input connected in parallel to said at least one input line, said arithmetic unit further including:
a first switching means which in a first mode connects said at least one input line to the input of said serial memory and in a second mode connects the output of said subtractor to the input of said serial memory; and a second switching means which in a first mode connects the output of said serial memory to said at least one output line and in a second mode connects the output of said adder to said at least one output line; with said first and second switching means being controlled so as to be in said first mode when said first M/2 points are received and in said second mode when said second M/2 points are received.

16. A transform processing circuit as claimed in claim 14 or 15 wherein the value of m increments by 1 as the arithmetic units are traversed from the second to the first input/output terminal with m=1 for the first arithmetic unit traversed.

17. A transform processing circuit as claimed in claim 16, wherein m equals 8 for the last arithmetic unit traversed.

18. A transform processing circuit as claimed in claim 17, wherein the position of said another end column is variable and depends on the length of data words stored in said array.

19. A transform processing circuit as claimed in claim 18, wherein said serial memory includes modified memory cells disposed in one row of said array, said modified cells being configured in said array, such that data transfer within said array is the same as for the cells in the other rows, except data read from one of said modified cells is written into a cell two columns across from said one of said modified cells, thereby removing a delay introduced by input/output circuitry connected to said array so that the delay incurred by data propagated through said serial memory is proportional to the number of rows of cells in said array.

20. A transform processing circuit as claimed in claim 13, wherein said serial memory includes an array of memory cells which are configured in rows and columns such that data read from one of said cells is written into another of said cells disposed in an adjacent row and one column across from said one of said cells, the direction of transfer of data being the same for each cell in a row, except for a cell of said row disposed in an end column of said array which transfers data stored therein to a cell in the adjacent row disposed in the any other end column of said array.

21. A transform processing circuit as claimed in claim 13, wherein said multiplication units are each adapted to perform q point complex twiddle factor operations where q is an even square number dependent on the position of a respective multiplication unit in said circuit, said twiddle factor operations comprising multiplying complex sample points represented by data inputted to said multiplication units by predetermined complex twiddle factors.

22. A transform processing circuit as claimed in claim 21, wherein for N=256 and traversing the multiplication units from the first input/output terminal to the second input/output terminal, q equals, 4, 16, 4, 256, 4, 16, 4, respectively.

23. A transform processing circuit as claimed in claim 22, wherein the multiplication units adapted to perform said 16 point and 256 point twiddle factor operations include a pipeline complex multiplier which is adapted to multiply two complex operands represented by two respective data streams inputted simultaneously to the multiplier, the product being represented by a further data stream outputted form said multiplier, said multiplier, in multiplying two coefficients of the operands, performing a sign extension operation so as to prevent over flow in a sign bit when adding data representative of a previous partial sum to data representative of a partial product so as to generate data representative of a new partial sum whereby a final partial sum, which is the sum of a number of said partial products, is the product of said two coefficients.

24. A transform processing circuit as claimed in claim 23, wherein said sign extension operation comprises using the result of an OR operation between the most significant bit of the data representative of the previous partial sum and the most significant bit of data representative of the partial product as the sign bit of the data representative of the new partial sum.

25. A transform processing circuit as claimed in claim 23, wherein said sign extension operation comprise using the result of $PPS.\overline{PP}+PP.\overline{C}+PPS.\overline{C}$ as the sign bit of the data representative of the new partial sum, where PPS is the most significant bit of the data representative of the previous partial sum, PP is the most significant bit of the data representative of the partial product and C is the carry generated on calculating the second most significant bit of the data representative of the previous partial sum.

26. A transform processing circuit as claimed in claim 23, wherein said multiplication units adapted to perform said 16 and 256 point operations include memory for storing data representative of said predetermined compiled twiddle factors.

27. A transform processing circuit as claimed in claims 22, 23, 24 or 25, wherein the 3 point multiplication units include a j rotator which interchanges data representative of the real and imaginary parts of a complex sample point inputted thereto and two's complements the data representative of the real part so as to chain data representative of of the product of —j and the complex sample point inputted thereto.

28. A processing circuit as claimed in claims 14, 15, 18, 19, 22, 23, 24, or 25 wherein, said bi-directional bus and said input and output lines comprise:

a real data line for transmitting data words representative of the real part of said complex sample points;

an imaginary data line for transmitting data words representative of the imaginary parts of said complex sample points;

a word line for transmitting a word signal which indicates the beginning of data words appearing on said imaginary and real data lines; and a vector start line for transmitting a vector start signal which indicates the beginning of a consecutive series of data words on said real and imaginary lines representative of N complex sample points.

29. A transform processing circuit as claimed in claim 28, wherein said function block comprises a synchronizer which synchronizes processing of said data words in said function block in response to said word and vector start signals.

* * * * *

UNITED STATES PATENT AND TRADEMARK OFFICE
CERTIFICATE OF CORRECTION

PATENT NO. : 5,297,070
DATED : March 22, 1994
INVENTOR(S) : Hua et al.

It is certified that error appears in the above-identified patent and that said Letters Patent is hereby corrected as shown below:

On the title page, please delete item " [22] Filed:   April 6, 1990" and insert -- [22] PCT Filed:  August 22, 1988 --.

On the tilte page, please insert -- [86] PCT No.:        PCT/AU88/00316

§ 371 Date:    April 6, 1990

§ 102(e) Date: April 6, 1990 --.

On the title page, please insert -- [87] PCT Pub No.:  WO89/01688 --.

PCT Pub. Date:  Feb. 23, 1989 --.

Signed and Sealed this

Twenty-first Day of October 1997

*Attest:*

BRUCE LEHMAN

*Attesting Officer*     Commissioner of Patents and Trademarks